United States Patent
Hinterberger et al.

(10) Patent No.: US 11,685,267 B2
(45) Date of Patent: Jun. 27, 2023

(54) BATTERY WITH A BATTERY CELL AND METHOD OF OPERATION THEREOF

(71) Applicant: AUDI AG, Ingolstadt (DE)

(72) Inventors: Michael Hinterberger, Großmehring (DE); Christoph Terbrack, Ingolstadt (DE); Christian Endisch, Geisenfeld (DE); Julia Stöttner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 286 days.

(21) Appl. No.: 17/096,517

(22) Filed: Nov. 12, 2020

(65) Prior Publication Data
US 2021/0146791 A1 May 20, 2021

(30) Foreign Application Priority Data
Nov. 14, 2019 (DE) ...................... 10 2019 130 740.6

(51) Int. Cl.
*B60L 50/64* (2019.01)
*H02M 7/483* (2007.01)
(Continued)

(52) U.S. Cl.
CPC ............... *B60L 50/64* (2019.02); *B60L 53/22* (2019.02); *H01M 10/0445* (2013.01);
(Continued)

(58) Field of Classification Search
CPC ........ B60L 50/64; B60L 53/22; B60L 15/007; B60L 53/24; B60L 58/18; B60L 58/19;
(Continued)

(56) References Cited

U.S. PATENT DOCUMENTS

| 10,361,466 B2* | 7/2019 | Hinterberger ....... H01M 50/579 |
| 10,424,818 B2* | 9/2019 | Takami ................... B60L 58/21 |

(Continued)

FOREIGN PATENT DOCUMENTS

| DE | 10 2010 041 059 A1 | 3/2012 |
| DE | 10 2014 110 410 A1 | 1/2016 |

(Continued)

OTHER PUBLICATIONS

Examination Report dated Oct. 22, 2020 in corresponding German application No. 10 2019 130 740.6; 16 pages including Machine-generated English-language translation.

*Primary Examiner* — M Baye Diao
(74) *Attorney, Agent, or Firm* — Maier & Maier, PLLC

(57) ABSTRACT

A battery cell with a galvanic cell, a first semiconductor switching element, a first cell connector electrically coupled directly to a first potential connector of the galvanic cell, and a second cell connector electrically coupled to a second potential connector of the galvanic cell via the first semiconductor switching element. The battery cell further has a third cell connector electrically coupled to the second potential connector of the galvanic cell, a second semiconductor switching element, and a fourth cell connector electrically coupled to the first potential connector of the galvanic cell via the second semiconductor switching element. A third semiconductor switching element is connected between the third cell connector and the fourth cell connector which primarily serves to switch individual battery cells out of the system regardless of the (activation or deactivation) state of the predecessor as well as successor cells.

6 Claims, 9 Drawing Sheets

(51) Int. Cl.
*B60L 53/22* (2019.01)
*H01M 10/04* (2006.01)
*H01M 50/502* (2021.01)

(52) U.S. Cl.
CPC ......... *H01M 50/502* (2021.01); *H02M 7/483* (2013.01); *H01M 2220/20* (2013.01)

(58) Field of Classification Search
CPC ........... H01M 10/0445; H01M 50/502; H01M 2220/20; H01M 10/441; H01M 50/51; H02M 7/483; H02M 7/4835; Y02T 10/64; Y02T 10/92; Y02T 10/70; Y02T 10/7072; Y02T 90/14; Y02E 60/10; Y02P 70/50; H02J 7/0013; H02J 7/0063
USPC ......................................................... 320/137
See application file for complete search history.

(56) References Cited

U.S. PATENT DOCUMENTS

| | | | | |
|---|---|---|---|---|
| 10,637,251 | B2* | 4/2020 | Helling | H02J 3/38 |
| 10,790,743 | B2* | 9/2020 | Götz | H02M 3/155 |
| 2012/0243130 | A1* | 9/2012 | Gaben | H01M 10/4207 361/42 |
| 2015/0380959 | A1* | 12/2015 | Chang | H02J 7/0016 320/118 |
| 2018/0219478 | A1* | 8/2018 | Götz | H02J 7/00 |
| 2019/0299799 | A1* | 10/2019 | Hinterberger | H01M 10/44 |
| 2020/0412164 | A1* | 12/2020 | Miller | H02J 15/00 |
| 2021/0078415 | A1* | 3/2021 | Ohata | H02J 7/02 |

FOREIGN PATENT DOCUMENTS

| | | |
|---|---|---|
| DE | 10 2015 112 512 A1 | 2/2017 |
| DE | 10 2016 106 359 A1 | 10/2017 |
| DE | 10 2016 224 002 A1 | 6/2018 |

* cited by examiner

BATTERY WITH A BATTERY CELL AND METHOD OF OPERATION THEREOF

FIELD

The disclosure relates to a battery cell with a galvanic cell, a first semiconductor switching element, a first cell connector electrically coupled directly to a first potential connector of the galvanic cell, and a second cell connector electrically coupled to a second potential connector of the galvanic cell via the first semiconductor switching element. The disclosure further relates to a battery with several battery cells, at least two battery connector poles, and a control unit, wherein a specified number of the battery cells is connected in series and the series connection is connected with a first end to a first one of the at least two battery connector poles and with a second end to a second one of the at least two battery connector poles. The disclosure furthermore relates to a method for providing a specifiable electrical voltage by means of a battery, wherein the battery comprises at least a specified number of battery cells connected in series, wherein each of the battery cells of the series connection comprises a galvanic cell, a first semiconductor switching element, a first cell connector electrically coupled directly to a first potential connector of the galvanic cell, and a second cell connector electrically coupled to a second electric potential connector of the galvanic cell via the first semiconductor switching element. Finally, the disclosure also relates to a motor vehicle with an on-board network comprising an electric machine as a drive equipment and a battery.

BACKGROUND

Battery cells, batteries with battery cells, methods of operation thereof, and motor vehicles of the generic type are extensively known in the art. Apart from stationary applications, for example, in uninterruptible energy supplies, electrical energy supplies in isolated operations, and/or the like, batteries of the generic type are also used in motor vehicles, in particular in electrically drivable motor vehicles, such as electric vehicles, hybrid vehicles, or the like.

The battery of the generic type typically serves to reversibly store electrical energy. Such a battery is also referred to as an accumulator. For the purpose of reversible energy storage, the battery typically comprises several battery cells, each comprising a galvanic cell capable of chemically storing the electrical energy. For this purpose, the galvanic cell typically has two electrodes forming the respective potential connectors of the galvanic cell. The electrodes are in electrochemical connection with one another, for example, via an electrolyte interacting with the electrodes. An electrical DC voltage is then established at the electrodes, resulting essentially due to the electrochemistry. The DC voltage established between the electrodes of an individual galvanic cell is commonly low in volts, for example, about 1.2V to about 4.5V depending on cell chemistry.

Batteries of the generic type are often intended to provide high DC voltages, for example, in electrically drivable motor vehicles, a DC voltage in a range of several 100V, preferably about 400V or more, in particular about 800V. This results in a need to electrically connect a plurality of battery cells in series in order to implement such DC voltages using a battery. Depending on the energy or power demand, a parallel connection of battery cells may supplementarily be required as well.

In the art, particularly in electrically drivable motor vehicles, the battery is commonly coupled to an electric machine as the drive equipment via an energy converter frequently formed by an inverter or a DC-to-DC converter. This proves to be complex. Moreover, it should be noted that two-point or three-point inverters are typically employed as inverters. As a result, the issue of electromagnetic compatibility is highly relevant in energy conversion and, moreover, a harmonic component in an AC voltage provided by the inverter may be large. The same considerations basically apply to DC-to-DC converters. Also, the load on the semiconductor elements employed in the inverter (IGBTs, for instance) is very high. The voltage swing these semiconductor elements have to withstand corresponds to the full output voltage at the terminals of the battery.

A method for setting a desired output voltage in an energy supply branch of a controllable energy storage is known from DE 10 2010 041 059 A1. This teaching provides an energy storage comprising a multiplicity of energy storage modules connected in series, each in turn comprising a multiplicity of energy storage cells connected in series. Each of the energy storage modules has two switching elements, the energy storage cell located in the module being connected in series to one of the switching elements and this series connection being connected in parallel to the second switching element. Thereby, a respective energy storage module may be activated or deactivated by switching the switching elements correspondingly.

By appropriately switching the switching elements, it should be possible to provide an AC voltage at a respective end of such a series connection, specifically in the manner of a multi-level converter, also referred to as an MMC, M2C, MMI, M2I, or the like. This should enable the inverter according to the teaching of DE 10 2010 041 059 A1 to be eliminated.

Multi-level converters and methods of operation thereof are also extensively known in the art, such that separate documentary evidence thereof is not required. This also applies to converter modules of such a multi-level converter, which serve to construct the multi-level converter. Multi-level converters are a special design of clocked energy converters. Such multi-level converters are preferably employed bidirectionally, such that electrical energy can be converted both from an AC voltage side to a DC voltage side and vice versa. The conversion usually takes place without any significant change in the voltage levels, that is, the level of a maximum amplitude of the AC voltage essentially corresponds to half a level of an intermediate circuit DC voltage of a DC voltage intermediate circuit (see MMC) to which the multi-level converter is connected. This substantive matter is disadvantageous in the prior art topology of the MMC, since a separated number of cells is necessary to generate voltages of different polarities (positive and negative), that is, to generate a sinusoidal output voltage, for instance, for a specified amount of battery cells, one half of the battery cells is needed for the positive half-sine wave and the other half is needed for the negative half-sine wave, respectively. This means that output voltages can only be generated with an amplitude value that corresponds to half the maximum battery output voltage.

The multi-level converter typically has a series connection made up of a multiplicity of converter modules, in turn comprising a converter module capacitor and—connected in parallel thereto—a series connection made up of two semiconductor switches connected in series. The converter module capacitor does not need to be formed by a capacitor only, but it may rather also have one or more battery cells and/or electrical energy sources. Due to the circuit structure, control of the converter modules is relatively reliable compared to alternative circuit concepts, in particular with regard to a two-point inverter, which is why the multi-level converter is particularly suitable for applications with high electrical voltages. Moreover, the multi-level converter does not need any intermediate circuit capacitor on the intermediate circuit side, which, besides, proves to be very complex and expensive in case of a high electrical voltage.

Interconnection options are known for multi-level converters ranging from so-called flying capacitor neutral point clamped (NPC) multi-level converters to cascaded H-bridge (CHB) multi-level converters. The latter are primarily distinguished by their scalability, since the output voltage can be generated by consecutively connecting individual modules. The modules or converter modules usually have an H-bridge circuit of semiconductor switches as well as the converter module capacitor. As an alternative to the converter module capacitor, a battery or a battery module may also be provided. Depending on the circuit structure, any number of phases and thus any n-phase AC voltage may be generated.

Apart from the CHB variant, another option is cascading half-bridge modules only having two semiconductor switches connected in series and the related converter module capacitor or battery cell. Although the number of semiconductor switches may be reduced in this case, for example, by about half, which in turn may also achieve a reduction in power loss during operation as intended, this circuit structure proves to be disadvantageous in that it may only achieve unipolarity with regard to the AC voltage. This problem also underlies the teaching of DE 10 2010 041 059 A1.

SUMMARY

It is an object of the disclosure to develop a battery cell of the generic type, a battery, a method for providing a specifiable electrical voltage by means of a battery, and a motor vehicle in such a way that the battery may be utilized for direct supply of an energy supply network, in particular an electric machine to be applied with AC voltage, wherein the expenditure is reduced compared to the prior art.

As a solution, the disclosure proposes a battery cell, a battery, a method for providing a specifiable electrical voltage by means of a battery, and a motor vehicle.

With regard to a generic battery cell, it is particularly proposed that it has a third cell connector electrically coupled to the second potential connector of the galvanic cell, a second semiconductor switching element, and a fourth cell connector electrically coupled to the first potential connector of the galvanic cell via the second semiconductor switching element, wherein a third semiconductor switching element is connected between the third cell connector and the fourth cell connector.

With regard to a generic battery cell, according to a first aspect, the disclosure proposes in particular that the battery cells are designed according to the disclosure, wherein for implementation of the series connection, a respective first cell connector of a respective first one of the battery cells is electrically connected to a second cell connector of a respective second one of the battery cells, and a respective third cell connector of the respective first one of the battery cells is electrically connected to a fourth cell connector of the respective second one of the battery cells, and the control unit is connected to at least first, second and third semiconductor switching elements of the respective battery cells in order to operate the semiconductor switching elements depending on a specifiable electrical voltage at the respective battery connector poles.

With regard to a generic battery, according to a second aspect, the disclosure proposes in particular that the battery cells each have a galvanic cell, a first semiconductor switching element, a first cell connector electrically coupled directly to a first potential connector of the galvanic cell, and a second cell connector electrically coupled to a second potential connector of the galvanic cell via the first semiconductor switching element, wherein the battery cells have a third cell connector electrically coupled to the second potential connector of the galvanic cell, a second semiconductor switching element, and a fourth cell connector electrically coupled to the first potential connector of the galvanic cell via the second semiconductor switching element, wherein for implementation of the series connection, a respective first cell connector of a respective first one of the battery cells is electrically connected to a second cell connector of a respective second one of the battery cells, and a respective third cell connector of the respective first one of the battery cells is electrically connected to a fourth cell connector of the respective second one of the battery cells, wherein galvanic cells of three directly consecutive battery cells in the series connection can be bypassed by means of a bypass switching element, and the control unit is connected to at least the first and second semiconductor switching elements of the respective battery cells as well as to the at least one bypass switching element in order to operate the semiconductor switching elements and the at least one bypass switching element depending on a specifiable electrical voltage at the respective battery connector poles.

With regard to a generic method, according to the first aspect, the disclosure proposes in particular that each battery cell of the series connection comprises a third cell connector electrically coupled to the second potential connector of the galvanic cell, a second semiconductor switching element, and a fourth cell connector electrically coupled to the first potential connector of the galvanic cell via the second semiconductor switching element, wherein a third semiconductor switching element is connected between the third cell connector and the fourth cell connector, wherein for implementation of the series connection, the respective first cell connector of a respective first one of the battery cells is electrically connected to the second cell connector of a respective second one of the battery cells, and the respective third cell connector of the respective first one of the battery cells is electrically connected to the fourth cell connector of the respective second one of the battery cells, wherein the semiconductor switching elements of the battery cells are activated depending on an electrical voltage specified for the series connection in order to provide the specified electrical voltage at the ends of the series connection.

With regard to a generic method, according to the second aspect, the disclosure proposes in particular that each battery cell of the series connection comprises a third cell connector electrically coupled to a second potential connector of the galvanic cell, a second semiconductor switching element, and a fourth cell connector electrically coupled to the first potential connector of the galvanic cell via the second semiconductor switching element, wherein for implementation of the series connection, a respective first cell connector of a respective first one of the battery cells is electrically connected to a second cell connector of a respective second one of the battery cells, and a respective third cell connector of the respective first one of the battery cells is electrically connected to a fourth cell connector of the respective second one of the battery cells, wherein the semiconductor switching elements of the battery cells are activated depending on an electrical voltage specified for the series connection in order to provide the specified electrical voltage at ends of the series connection.

With regard to a motor vehicle of the generic type, it is proposed in particular that the battery is designed according to the disclosure and the electric machine is connected directly to the battery.

The disclosure is based, inter alia, on the idea that, using a special structure of the circuit of a respective one of the battery cells, a modular construction of the battery can be achieved with little expenditure, such that using suitable control by the control unit, the battery is able to provide almost any electrical voltage at the battery connector poles or at the ends of the respective series connection. As required, the setting of the electrical voltage can be varied over time such that, for instance, specifiable AC voltages can be provided as well. This makes it possible for the battery of the disclosure to provide an AC voltage in the manner of a multi-level converter. The circuit structure allows for providing an electrical voltage in a highly flexible manner, in particular dynamically, by means of the battery. In doing so, the battery cells of the battery may be employed at least partially like converter modules of a multi-level converter. However, not all battery cells need to be utilized to provide a specified electrical voltage. In particular, it may be provided that only some of the battery cells of the battery are connected in series in order to provide the specified electrical voltage. Some of the battery cells may also be utilized as a reserve or to provide a further specifiable electrical voltage. The battery cell may also be formed by a comparable energy source that may receive and/or deliver electrical energy.

However, the disclosure is not limited to the provision of AC voltages only. It may also be provided that a DC voltage, a pulsating DC voltage, or the like may be provided depending on the specified electrical voltage. Several specified electrical voltages may also be provided, for example, three AC voltages offset in terms of their phase position in order to be able to provide three-phase AC voltage. On this basis, it is suitable for being employed to supply an electric machine in the motor vehicle. The disclosure is therefore also suitable, for instance, for the provision of an energy supply network utilizing AC voltage. Moreover, the disclosure may of course also be utilized to provide one or more adjustable DC voltages, for example, if the electric machine of the motor vehicle is a DC voltage machine, the output of which may be adjusted depending on the presently set electrical DC voltage.

In doing so, the disclosure is based on a new circuit structure of the respective ones of the battery cells, in which—in contrast to the prior art—a respective one of the battery cells has four cell connectors. As such, the specific circuit structure of a respective one of the battery cells makes it possible not only to activate or deactivate the respective battery cell in a series connection of the battery cells according to the disclosure, but also to be able to set the polarity of its galvanic cell as required. Thus, for instance, it is possible not only to bypass individual cells in the series connection made up of battery cells, for instance, in order to implement a lower present voltage value than the one the total voltage of all battery cells connected in series can provide, but moreover, polarities of galvanic cells may also be inverted, for instance, in order to reduce the electrical voltage provided or even to be able to provide negative electrical voltages at the battery connector poles. This function is possible although each battery cell has only two semiconductor switching elements. Otherwise, such a functionality may at best implement a more complicated/complex converter module of a CHB multi-level converter according to the CHB circuit structure with four switching elements per converter module capacitor or battery/battery cell.

As the disclosure is capable of providing this functionality with only two semiconductor switching elements for a respective one of the battery cells, losses that may occur during operation as intended may of course also be reduced accordingly. This makes the disclosure particularly suitable for integration into a battery. Moreover, it should be contemplated that the switching elements of a respective one of the battery cells only need to be adapted for the typically low DC voltage of the respective galvanic cell and no longer for the high voltage values at the output of the battery/the entire battery, for instance, about 400V to about 800V. Not only may inexpensive switching elements thereby be employed, but moreover, it is possible to employ switching elements that have particularly low conduction losses. Thereby, a supplementary reduction in losses may be achieved during operation as intended.

Due to the special circuit structure of the galvanic cells, which—in contrast to the prior art—has four cell connectors, it is thus possible to implement the desired functionality of the battery cells with just two semiconductor switching elements. Thus, the first semiconductor switching element makes it possible to activate the galvanic cell between the first and second cell connectors, such that a corresponding DC voltage may be provided at the first and second cell connectors. If, in contrast, the semiconductor switching element is in the switched-off state, no DC voltage is provided by the battery cell between the first and second cell connectors, since the first switching element remains opened or remains in the opened state. In this operating state, bypassing the battery cell may be implemented by the switched-on switching state of the second semiconductor switching element. The further functionality with regard to polarity reversal of the galvanic cell may be achieved in cooperation with the further battery cells in the series connection, specifically the battery cells that are directly connected to the respective battery cell. The galvanic cell may, for instance, be connected between the first and third cell connectors. Moreover, it is also possible for the galvanic cell to be connected between the second and fourth cell connectors. The semiconductor switching elements must then be provided accordingly.

To connect the battery cells in the series connection, it is therefore provided that, in the case of two battery cells to be electrically connected, the first cell connector of the first battery cell is electrically connected to the second cell connector of the second battery cell and the third cell connector of the first battery cell is electrically connected to the fourth cell connector of the second battery cell. This connection also applies to the remainder of the battery cells that are to be connected to one another in the series connection. Due to the structure of a series connection provided in this way and the functionality that can be implemented due to the circuit structure by actuating the semiconductor switching elements, the galvanic cell of a respective one of the battery cells may thus not only be activated or deactivated, but may also be inverted in terms of polarity, specifically in relation to provision of the respective DC voltage. The first semiconductor switching element, in conjunction with the first and second cell connectors as well as the galvanic cell, thus provides the functionality known in the art. The additional functionality according to the disclosure is thus implemented by the second semiconductor switching element in conjunction with the third and fourth cell connectors.

The disclosure therefore makes it possible, not only, but especially in electrically drivable motor vehicles, to be able to directly couple the high-efficiency electric machine provided as a drive equipment to the battery in order to implement the desired energy supply during operation as intended of the motor vehicle. Moreover, according to the second aspect, the disclosure may achieve a reduction in the overall number of switching elements of the battery. In contrast, the first aspect may achieve that the battery can be constructed in a simpler fashion due to the battery cells having an additional switching element.

As with a multi-level converter, the battery according to the disclosure may thus be used to provide a stepped electrical voltage which, in its shape, may approximate a sinusoidal curve, for instance. In contrast to conventional two-point or three-point inverters, in which only two and three different electric potentials are available, respectively, a considerably larger number of different potential levels or voltage levels may be implemented in the disclosure by means of the plurality of the galvanic cells. The number of voltage levels or the corresponding voltage resulting from the combination of the voltage levels is of course dependent on how many battery cells are available in the series connection and which electrical voltage the respective galvanic cells provide. Typically, the galvanic cells are designed in the same way, such that they essentially provide the same electrical voltage. Thereby, a significantly more precise simulation of a desired voltage curve may be implemented, in particular if it is variable over time, for example, in the case of a sinusoidal curve. Electrical voltages generated in this way, in particular AC voltages, have significantly lower distortion values compared to AC voltages generated with conventional inverters and, moreover, are preferably more reliable. This has a particular effect on electromagnetic compatibility, in particular with regard to radio interference such as mains-borne radio interference or the like.

The disclosure thus utilizes an innovative smart cell topology which may be optimized for the functionality of a multi-level converter. Thereby, both a positive and a negative electrical voltage may be provided with minimal losses of the semiconductor switching elements provided.

In order to generate a negative electrical voltage, the semiconductor switching elements located between the individual galvanic cells of the battery cell may be switched on, with the respective complementary semiconductor switching elements being switched on to present a positive electrical voltage. Depending on the desired voltage value of the electrical voltage to be provided, some, in particular consecutive, battery cells may also be bypassed with the aid of the additional semiconductor switching elements, such that the functionality of the multi-level converter may be implemented.

Due to the reduced number of semiconductor switching elements compared to the prior art, in particular with regard to a circuit structure of converter modules according to CHB, the number of the semiconductor switching elements located in a load path may be reduced, approximately by half. Regardless of the polarity and magnitude of the electrical voltage to be provided by the battery, there is always only a single one of the semiconductor switching elements in the current-carrying path or in the switched-on switching state for each battery cell.

Due to the battery cell according to the disclosure, a highly flexible circuit structure or circuit topology can also be achieved for the battery, making it possible to enable a simple way of adapting to specific applications by activating or deactivating battery cells, if necessary. It is thus possible to design the battery for the provision of a higher maximum electrical voltage by adding battery cells or, conversely, to ensure the provision of lower electrical voltages by removing battery cells, depending on the demanded output voltage. It is also possible to connect further series connections in parallel in order to be able to provide multi-phase AC voltage, for instance. The number of AC voltage phases to be provided may depend on a particular specific application.

With the battery of the disclosure, it is possible to be able to provide electrical voltages, in particular electrical voltages variable over time, of almost any curve shape, for example, a sinusoidal curve shape, a triangular curve shape, a sawtooth curve shape, and/or the like. Moreover, with a multi-phase AC voltage, it is possible to adjust phase shifts of individual phase voltages with respect to one another as well as voltage amplitudes of the phase voltages individually and in a highly flexible manner.

Moreover, according to the specified electrical voltage, depending on a specific application, it may be provided that the electrical voltage to be provided may also have a DC offset. For this purpose, the semiconductor switching elements only need to be controlled in such a way that the number of resulting positive and negative voltage levels differs.

The circuit topology or circuit structure according to the disclosure allows, in addition to simple expansion, even only a fraction of battery cells to be supplemented, for example, by a further partial series connection or the like within a single phase string or a single series connection. In this case, the additional battery cells do not need to correspond to the battery cells of the series connection, but may rather still be comprised in the battery regardless of this.

Several series connections may of course also be connected in parallel. However, it is particularly advantageous if not only one phase is implemented by a series connection but, for example—depending on an electrical current load or required electrical capacitance—several series connections may be associated with a respective phase as well.

It proves to be particularly advantageous that, if a respective battery cell is not needed to provide the specified electrical voltage or is defective, it may be deactivated overall in a simple manner by being able to bypass it by means of the existing semiconductor switching elements. In doing so, it may be provided that, due to the circuit structure, a further battery cell, for example, either its "predecessor" or its "successor", may also be deactivated for the provision of the electrical voltage.

The switching element, in particular the bypass switching element, may be formed by one or more semiconductor switching elements. Moreover, the switching element may also comprise an electromechanical switching element, for example, a relay, a contactor, and/or the like. Basically, the semiconductor switching element may also be formed by an electromechanical switching element or any other suitable switching element.

The switching element, in particular the semiconductor switching element or the bypass switching element, may be formed by a transistor, in particular a field-effect transistor, preferably a metal oxide field-effect transistor (MOSFET), an insulated-gate bipolar transistor (IGBT), but also a gate turn-off thyristor (GTO), and/or the like, or any other type of switching elements. These switching elements are preferably arranged integrated into the respective battery cells.

The switching element, bypass switching element or semiconductor switching element may be formed by a transistor, in particular a field-effect transistor, preferably a metal oxide field-effect transistor (MOSFET), an insulated-gate bipolar transistor (IGBT), but also a gate turn-off thyristor (GTO), and/or the like. These switching elements are preferably arranged integrated into the respective battery cells.

In order to provide the desired voltage provision functionality using the battery, the semiconductor switching elements are operated in a switching operation. With regard to a semiconductor switching element utilizing a transistor, the switching operation means that, in a switched-on switching state, a very small electrical resistance is provided between the connectors of the transistor forming a switching path, such that a high current flow is possible with a very small residual voltage. In a switched-off switching state, on the other hand, the switching path of the transistor is highly resistive, that is, it provides a high electrical resistance, such that there is essentially no or only very little, in particular negligible, current flow even with a high electrical voltage applied to the switching path. Linear operation of transistors differs from this.

The control unit is connected to at least the switching elements, in particular the bypass switching element or the semiconductor switching elements of the battery cells. For this purpose, the battery cell may have a respective communication interface via which it is in communication with the control unit. The communication interfaces may, for example, be designed to be wired and/or even wireless. A wirelessly designed communication link may be based on radio, in particular short distance radio, for instance. Each of the battery cells preferably has its own communication interface, by means of which it is in communication with the control unit. In particular, the communication interface on the battery cell side may be connected to a respectively integrated part of a battery cell controller, which in turn is connected to at least the semiconductor switching elements in order to control them in a specifiable manner with regard to their switching states. Thereby, activation or deactivation of the respective battery cell and even polarity of its respective galvanic cell may be controlled by means of the control unit.

The control unit itself may be provided as a separate structural unit. Preferably, however, it is part of the battery, and particularly preferably, it is arranged integrated into it.

By inserting an additional bridging/bypass switching element within the individual voltage strings, these switching elements may, for example, either be placed supplementarily between the positive pole of one battery cell and the positive pole of the following battery cell or between the positive pole of one battery cell and the positive pole of the battery cell after the next one.

The additional bypass switching elements enable an individual battery cell to be bypassed, for example, in the event of a fault or defect. Consequently, this creates the possibility of a serial interconnection of battery cells with only an odd or even number and thus deactivation or disconnection of the intermediate battery cells, for example, with a correspondingly even or odd index. In summary, one advantage of the proposed topology with bypass switching elements is that when bypassing a single battery cell is desired or necessary, there is no need to deactivate or disconnect two consecutive cells from the overall system, but rather the respective, for instance, defective, battery cell itself may be removed from voltage generation.

If the bypass switching element is placed between the positive poles of two consecutive battery cells, two switching elements are located between the corresponding battery cells in the current-carrying path while in the bypass mode of a battery cell.

If the bypass switching element is switched between the positive poles of battery cells with an even or odd number only, that is, between the positive pole of a battery cell and the positive pole of the battery cell after the next one, the number of switching elements may even be reduced by half as compared to the variant mentioned above.

Furthermore, in the variant mentioned second or in the second aspect, a further switching element may be eliminated for each existing string compared with the topology in which the bypass switching element is arranged between two consecutive battery cells. As a result, the need for driver units that serve to control the switching elements is also reduced as a consequence.

With the additional bypass switching element, an increased number of switching combinations is possible as well. For example, the proposed topology enables a switching combination for implementing the cascading of two even-numbered or odd-numbered battery cells. Thereby, modulation methods such as the charge balance control method can also be applied.

Inserting the bypass switching elements does not result in any significant increase in switching or conduction losses within the battery. Since the bypass switching elements are only used in the event of a cell defect or the like, both additional switching losses and additional line losses may converge to zero.

Since the bypass switching element takes over the current path of another power semiconductor while in the bypass mode of a battery cell, this does not necessarily result in any differences worth mentioning. If the variant of the bypass switching element is used between the positive poles of a battery cell and the cell after the next one, line losses may be reduced since there is only one switching element rather than two remaining in the current-carrying path.

The proposed topology may be expanded by any number of battery cells and phase strings connected in parallel thereto. This results in a system of n x m battery cells, with n battery cells located within a phase string of m parallel strings which may generate an m-phase output voltage.

Preferably, each of the battery cells has its own cell housing in which at least the first and second semiconductor switching elements are arranged and which has at least one connector contact for each of the cell connectors, wherein the connector contacts are arranged electrically isolated from one another. Thereby, a modular construction of the battery may be achieved in a simple manner by means of the cell housing, allowing the battery to be adapted for specific applications in a simple manner. Moreover, an individually manageable structural unit may be created, not only facilitating the manufacture of the battery, but moreover enabling the basic function of a respective battery cell to be checked prior to manufacturing of the battery. Thereby, the battery may be manufactured more reliably. The cell housing may also provide at least one communication interface allowing the semiconductor switching elements to be operated in the intended switching operation in order to be able to provide the specifiable electrical voltage.

The cell housing may have at least one printed circuit board with at least the semiconductor switching elements arranged thereon.

The cell housing may comprise a receiving frame, a receiving cup, and/or the like made of a suitable material, with at least some of the corresponding elements and/or units of the battery cell arranged therein or thereon. The material may, for example, have plastic and/or metal.

Preferably, the galvanic cell is arranged in or on the cell housing as well. The cell housing may preferably at least partially accommodate or encompass the galvanic cell. The cell housing may, for example, have one or more connector contacts for electrically contacting the potential connectors of the galvanic cell. The at least one connector contact may be provided, for example, by the aforementioned printed circuit board. The at least one connector contact is preferably designed in accordance with the at least one potential connector of the galvanic cell in order to achieve a reliable and permanent electrical connection therewith during operation as intended. The galvanic cell may further be arranged integrated with at least some of the further elements and/or units in or on the cell housing.

To connect the galvanic cell to the cell housing, mechanical and/or electrical connection means may be provided, such as one or more screw connections, one or more clip and/or plug connections, one or more adhesive, solder and/or weld connections, combinations thereof, or the like. Both a mechanical connection and an electrical connection may preferably be achieved with the connection means. However, it may also be provided that the galvanic cell is pressed with at least one of its potential connectors against a corresponding connector contact, for example, due to a spring force or the like, while in the state connected to the cell housing or arranged on the cell housing. Moreover, this configuration enables the galvanic cells to be manufactured separately from the battery cells. This enables the galvanic cells to be manufactured at different production sites, in particular even by different manufacturers. These may then be arranged in or on the cell housing in a separate production step.

It may also be provided that the galvanic cell is releasably arranged on or in the cell housing. Thereby, it is possible to separate the galvanic cell from the further elements and/or units of the battery cell both spatially and electrically. For instance, this enables the galvanic cell to be replaced, if necessary. The releasable connection may be formed, for instance, by one or more screw connections, one or more clip and/or plug connections, and/or the like.

Moreover, it may be provided that at least the first and second semiconductor switching elements are arranged in a housing, wherein the housing has at least one connector contact for each of the cell connectors, wherein the connector contacts are arranged electrically isolated from one another and the housing has further connectors for connecting the galvanic cell. In this configuration, the galvanic cell does not need to be comprised by the housing. It may, for example, be arranged externally. Moreover, the galvanic cell may also be arranged on or in the housing in a replaceable fashion. In particular, the galvanic cell may be arranged releasably. Preferably, the number of connectors corresponds to the number of potential connectors of the galvanic cell.

The control unit controls the semiconductor switching elements preferably in such a way that the desired electrical voltage is provided at the battery connector poles. If not all of the battery cells of the series connection are required to provide the specified electrical voltage, it may be provided by means of the control unit that different ones of the battery cells arranged in the series connection be deactivated, if necessary, in order to be able to achieve as uniform an overall stress on the battery cells on average as possible.

With regard to the battery according to the disclosure, it is proposed in particular that at least one battery cell is connected in parallel to one of the battery cells connected in series by electrically connecting their respective cell connectors to one another. With regard to the parallel connection of two individual battery cells, this means that the respective first, second, third, and fourth electrical cell connectors are connected to one another. If the battery cells are to be operated in parallel operation, their respective semiconductor switching elements may moreover be provided to be operated accordingly together in a switching operation.

In order to be able to electrically connect a respective series connection to the respectively associated ones of the battery connector poles, the second and fourth cell connectors of one of the respective end-side battery cells may be provided to form the one end of the series connection by connecting these cell connectors in parallel to one of the associated battery connector poles. In the battery cell arranged at the opposite end of the series connection, the first and third cell connectors may be connected to a switching unit comprising two semiconductor switching elements, in which a respective first one of their connectors is electrically connected to the other one of the two battery connector poles associated with the series connection, with their respective opposite second connectors being connected to the respective first and third cell connectors of this battery cell. Thereby, the series connection may be fully utilized in the desired manner with regard to its functionality.

It is further proposed that a corresponding number of further battery cells connected in series is connected in parallel to a specified number of battery cells of the series connection connected directly in series by electrically connecting the cell connectors of such further battery cells arranged at end sides to the corresponding end-side cell connectors of the number of battery cells connected directly in series. In the end-side battery cell, in which the second and fourth cell connectors form the end of the further parallel connection, the second and fourth cell connectors are preferably connected in parallel, the second semiconductor switching element of this battery cell remaining in the switched-off state. This makes it possible, in particular when providing electrical voltages lower than the maximum electrical voltage that can be provided by the series connection, to make an additional electrical capacitance available in a simple manner, such that a smaller electrical voltage may be electrically stressed more intensely or more frequently. The flexibility with regard to the battery may be expanded further.

It is also proposed that the battery has at least two independently operable series connections made up of the battery cells and at least one further battery connector pole, with at least one end of the series connection being individually connected to a respective one of the battery connector poles, preferably via a switching unit, in order to operate the semiconductor switching elements of the battery cells of the respective series connections independently of the semiconductor switching elements of the battery cells of the respective other series connection, but depending on an electrical voltage that can be individually specified for the respective series connection. This makes it possible in a simple manner to be able to provide several phases, in particular with regard to AC voltages. However, it may also be provided that DC voltages that are independent of one another can be provided, or combinations thereof.

Wherein the respective semiconductor elements maintain their state (opened or closed) constant over time.

With regard to the method it is further proposed that an AC voltage is specified as the specified electrical voltage. Thereby, the battery may be utilized as an inverter at the same time, eliminating corresponding expenditure.

It is further proposed that the semiconductor switching elements of the battery cells during operation as intended to provide the specified electrical voltage are operated in such a way that the galvanic cells of the battery cells are stressed uniformly. The uniform stress is preferably provided on average over time. For this purpose, it may be provided that the control unit selects battery cells that are not required for providing the predetermined electrical voltage, for example, cyclically, such that the stress on average over time is preferably essentially the same for all battery cells of the series connection. This proves to be particularly advantageous when an AC voltage is provided, wherein in order to provide small voltage values of the AC voltage, different ones of the battery cells with regard to their SOC value, but also to parameters such as temperature, SOH values, or the like of the series connections, may be cyclically activated. This enables balancing related to the battery cells with regard to their state of charge (SOC), but also parameters such as temperature, state of health (SOH), and/or the like, of the respective series connection to be achieved. However, this does not exclude the possibility that the battery cells differ in properties, in particular chemical properties. Highly different types of battery cells may be operated together using the present idea.

Basically, the procedure according to the disclosure may not only be utilized for providing an electrical voltage and for providing electrical energy, but it may also be utilized to charge the battery by supplying it with electrical energy. The application is therefore not limited to delivering electrical energy through the battery, but it may also be utilized to receive energy and to store the electrical energy.

Advantages and effects indicated for the battery cell according to the disclosure, the battery according to the disclosure, the motor vehicle according to the disclosure, and the method according to the disclosure apply equally to all aspects of the disclosure and vice versa. In particular, device features may therefore also be formulated as method features and vice versa.

The disclosure also includes developments of the method according to the disclosure having features as already described in the context of the developments of the motor vehicle according to the disclosure. For this reason, the corresponding developments of the method according to the disclosure are not described again herein.

The motor vehicle according to the disclosure is preferably designed as an automobile, in particular as a passenger car or truck, or as a passenger bus or motorcycle.

The disclosure also comprises the combinations of the features of the described embodiments.

BRIEF DESCRIPTION OF THE FIGURES

Exemplary embodiments of the disclosure are described hereinafter. In the drawings.

DETAILED DESCRIPTION

Figure 1:
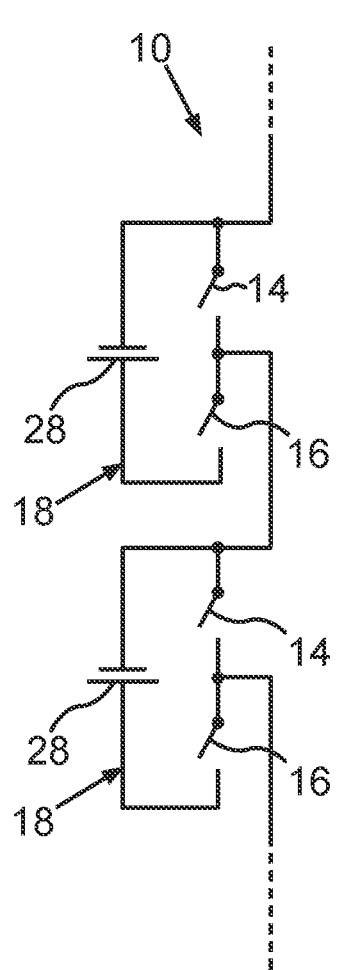
FIG. 1 shows a schematic circuit diagram of two converter modules of a multi-level converter not depicted further connected in series in a half-bridge circuit.

The exemplary embodiments explained hereinafter are preferred embodiments of the disclosure. In the exemplary embodiments, the described components of the embodiments each represent individual features of the disclosure intended to be considered independently of one another, each also developing the disclosure independently of one another. Therefore, the disclosure is intended to comprise combinations of the features of the embodiments other than those depicted. Furthermore, the described embodiments may also be supplemented by further features of the previously described features of the disclosure.

In the figures, like reference numerals designate elements with the same function.

FIG. 1 shows a schematic circuit diagram of a detail of a multi-level converter 10 with converter modules 18 connected in series, the converter modules 18 being designed in a half-bridge circuit. As such, each converter module 18 comprises a series connection made up of two semiconductor switching elements 14, 16, to which a battery cell 28 is connected in parallel as a converter module capacitor. A center tap of the semiconductor switching elements 14 and 16 connected in series and a connector of the battery cell 28 (FIG. 3) form module connectors of the converter module 18.

Figure 2:
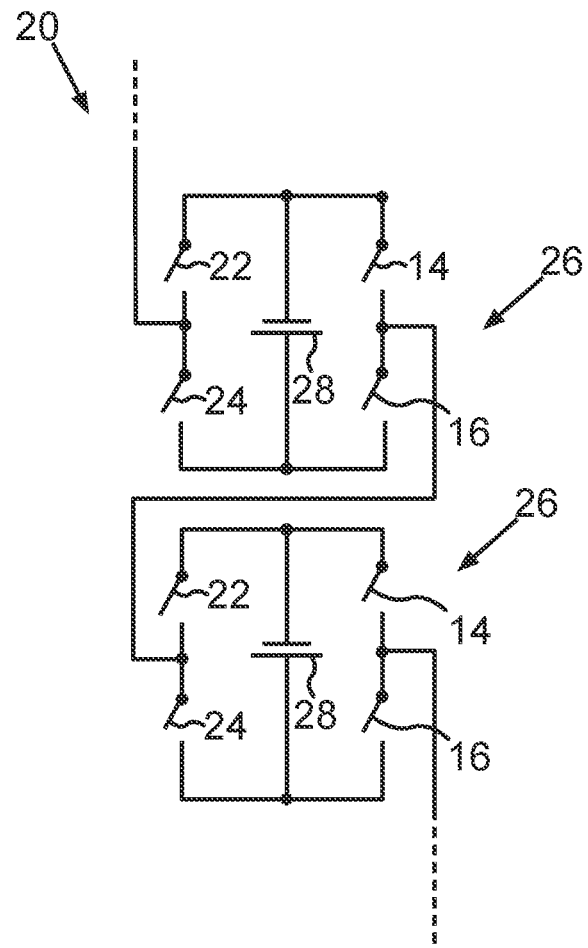
FIG. 2 shows a schematic circuit diagram as in FIG. 1, wherein the transducer modules are herein configured in a full-bridge circuit.

FIG. 2 shows a further configuration of a multi-level converter 20 with converter modules 26, the multi-level converter 20 differing from the multi-level converter 10 by the circuit structure of the converter modules 26. The converter modules 26 have a second series connection made up of semiconductor switching elements 22, 24, which is supplementarily connected in parallel to the battery cell 28 and thus also to the series connection made up of the semiconductor switching elements 14, 16. The converter module 26 has the center taps of the series connections of the semiconductor switching elements 14, 16, 22, 24 as connectors.

The function of the multi-level converters 10, 20 is known in the art and is explained, for example, in DE 10 2015 205 267 A1 and employing a converter module capacitor designed as an electrical capacitor.

Figure 3:
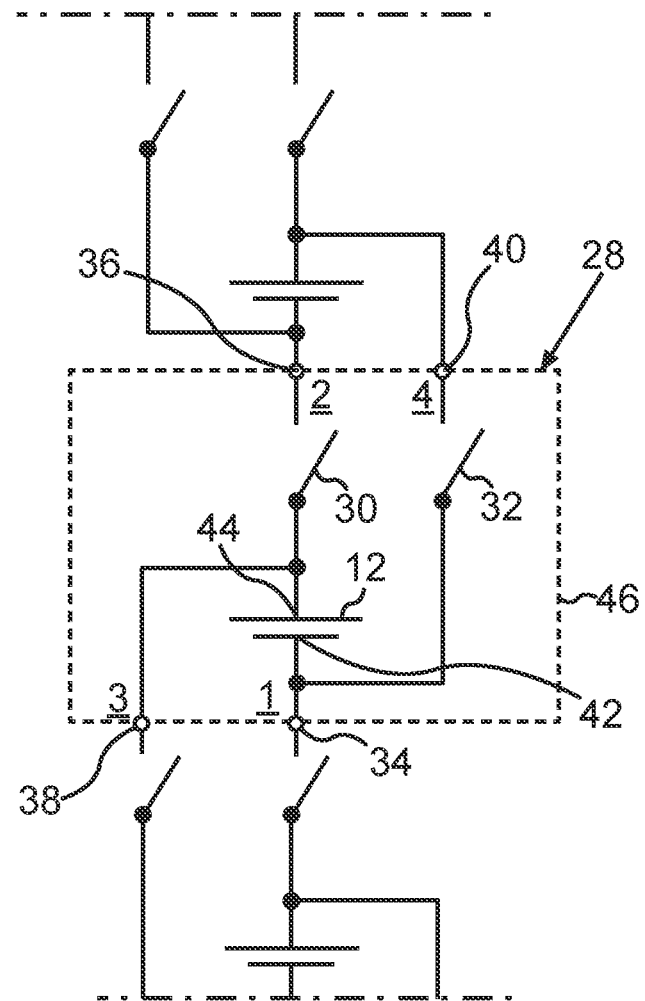
FIG. 3 shows a schematic circuit diagram of a battery cell according to the disclosure.
Figure 4:
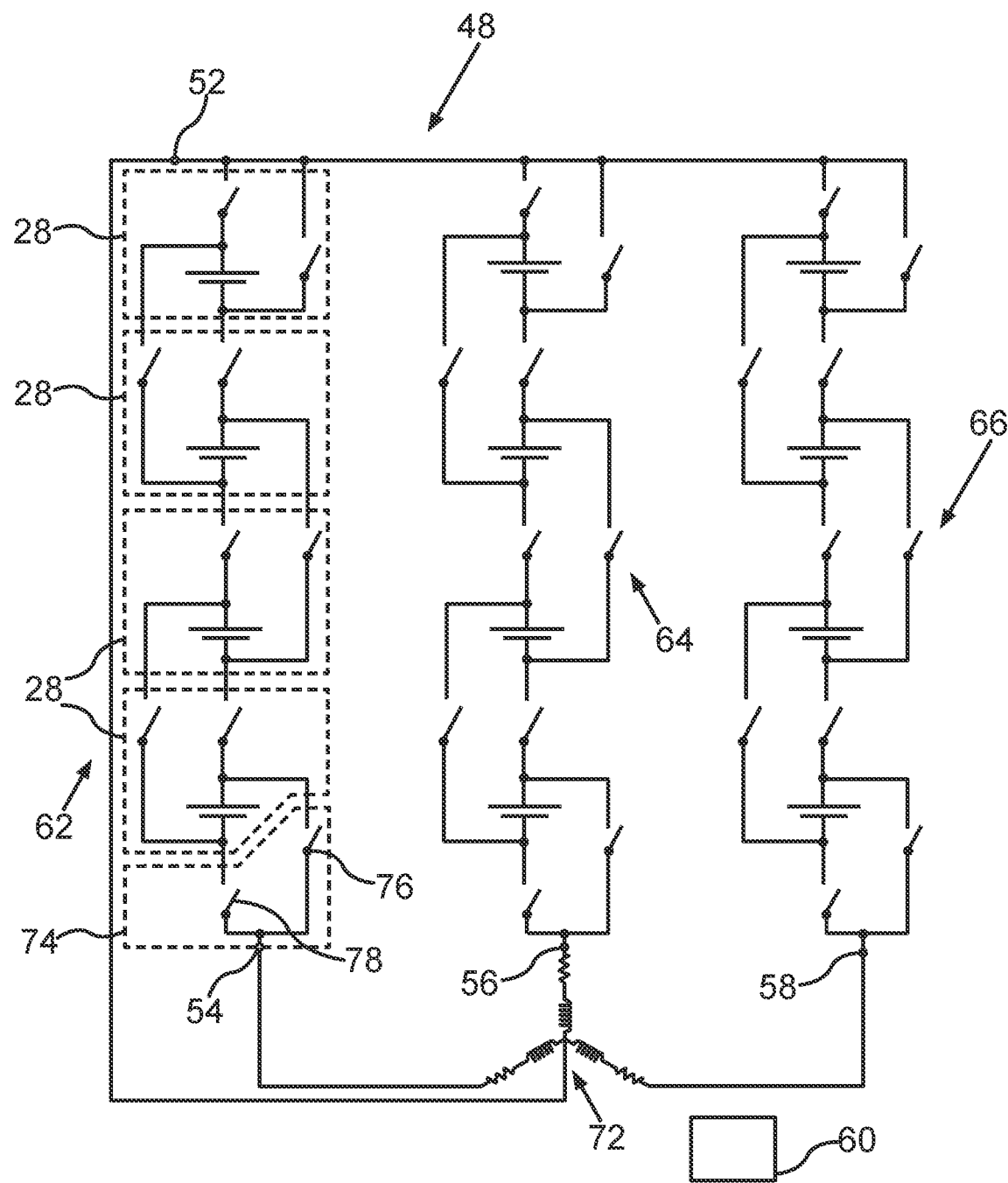
FIG. 4 shows a schematic circuit diagram of a battery according to the disclosure with battery cells according to FIG. 3 connected in three series connections for forming three phases, to which a three-phase asynchronous machine is connected.
Figure 5:
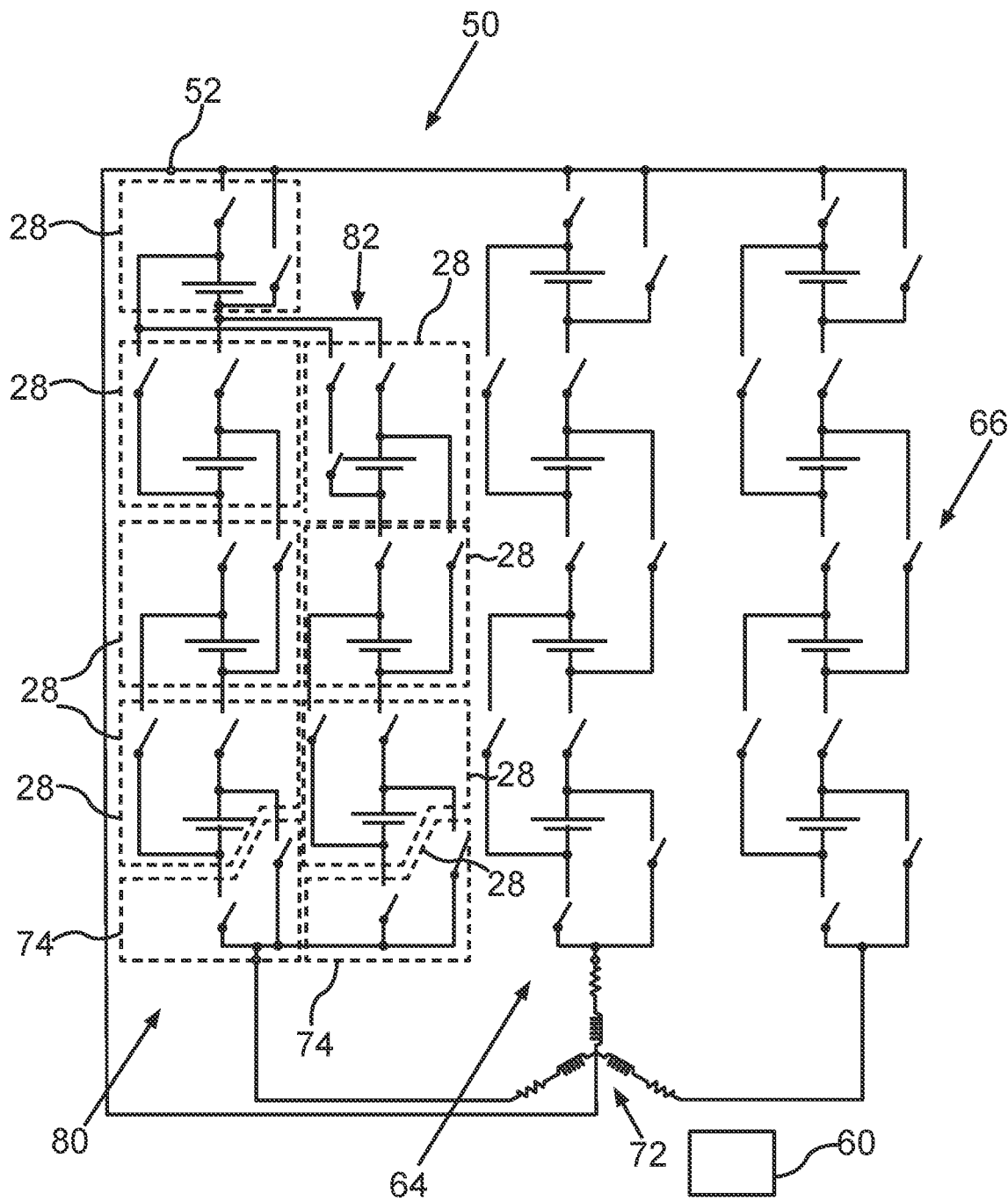
FIG. 5 shows a schematic diagram as in FIG. 4, with the first series connection comprising a second series connection made up of battery cells of the disclosure connected in parallel.

FIG. 3 shows a schematic circuit diagram of a battery cell 28 with a galvanic cell 12. The battery cell 28 serves as an element for the modular construction of a battery 48, 50 (FIGS. 4, 5). The galvanic cell 12 is designed as an electrochemical cell and has two electrodes forming a first potential connector 42 and a second potential connector 44. In the present configuration, the galvanic cell 12 is designed as a lithium-ion cell. In alternative configurations, another galvanic cell may also be provided herein, for example, a lead-acid cell or the like.

The battery cell 28 has a first cell connector 34 electrically coupled directly to the first potential connector 42 of the galvanic cell 12. Further, the battery cell 28 has a second cell connector 36 electrically coupled to a second potential connector 44 of the galvanic cell 12 via a first semiconductor switching element 30 of the battery cell 28. The first semiconductor switching element 30 is herein formed by a transistor, specifically a field-effect transistor of the MOSFET type. Alternatively, a different transistor, for example, an IGBT or the like, may of course also be employed herein.

The battery cell 28 further comprises a third cell connector 38 electrically coupled to the second potential connector 44 of the galvanic cell 12, a second semiconductor switching element 32, which may essentially be designed like the first semiconductor switching element 30, and a fourth cell connector 40 electrically coupled to the first potential connector 42 of the galvanic cell 12 via the second semiconductor switching element 32. Thus—in contrast to the prior art—the battery cell 28 herein has four cell connectors 34, 36, 38, 40. As will be explained below, this specific circuit structure of the battery cell 28 enables specific functionalities to be achieved when operating a battery 48, 50 constructed with the battery cells 28.

FIG. 4 shows a schematic circuit diagram of a battery 48 comprising a multiplicity of battery cells 28, as explained in accordance with FIG. 3. The battery 48 comprises battery connector poles 52, 54, 56, 58, to which a three-phase asynchronous machine 72 is directly connected. Herein, the asynchronous machine 72 is designed as a three-phase electric machine in a star connection. A star point, not designated, of the asynchronous machine 72 is connected to the battery connector pole 52. Respective phase connectors of the asynchronous machine 72 are connected to the battery connectors 54, 56, 58. Basically, a delta connection may also be provided.

As can be seen from FIG. 4, the battery cells 28 are connected to form three series connections 62, 64, 66. A respective one of the series connections 62, 64, 66 is connected to the battery connector pole 52 via one of the battery cells 28 arranged at end sides, specifically its second and fourth cell connectors 36, 40, providing one end of the respective series connections 62, 64, 66. The battery cells 28 arranged at the opposite ends of the series connections 62, 64, 66 are connected to the respective associated battery connector poles 54, 56, 58 via respective switching units 74. The series connections 62, 64, 66 are herein formed essentially identically.

The switching units 74 comprise respective semiconductor switching elements 76, 78, which herein may be designed like the switching elements 30, 32. With one of their connectors, the semiconductor switching elements 76, 78 are connected directly to the corresponding one of the battery connector poles 54, 56, 58. The opposite connectors of the semiconductor switching elements 76, 78 are electrically connected to the respective first and third connectors 34, 38 of the respective one of the battery cells 28 located at an end side.

This circuit structure makes it possible for each of the series connections 62, 64, 66 to be capable of providing an individual electrical voltage, which is an AC voltage herein. The AC voltages provided by the series connections 62, 64, 66 are herein out of phase by 120 degrees in order to provide a three-phase AC voltage for the asynchronous machine 72.

The battery 48 further comprises a control unit 60 to which the switching elements 30, 32 of the battery cells 28 and the switching elements 76, 78 of the switching units 74 are connected.

By appropriately switching the switching elements, battery cells 28 may be activated or deactivated in order to be able to provide an AC voltage to be provided according to a respective specified electrical AC voltage at the battery connector poles 54, 56, 58 opposite the battery connector pole 52. Thereby, it is possible for the battery 48 to provide the functionality of a three-phase inverter herein at the same time, such that a separate inverter for operating the asynchronous machine 72 may be eliminated.

The circuit structure according to the disclosure enables providing both positive and negative electric potentials with respect to the battery connector pole 52, which herein serves as an electrical reference potential. Moreover, it is possible, if necessary, to vary amplitudes and/or even phase shifts between the electrical voltages provided by the series connections 62, 64, 66, as necessary, if this is desired during intended operation of the asynchronous machine 72.

Even if only motor operation of the asynchronous machine 72 is described herein, a corresponding functionality is also possible during generator operation of the asynchronous machine 72. Herein, this is not important for the functionality of the battery 48 according to the disclosure.

Moreover, the control unit 60 is also designed herein to deactivate respective battery cells 28 when providing voltage values that are smaller than the maximum possible amplitude of a respective one of the series connections 62, 64, 66. If necessary, different ones of the battery cells 28 may be deactivated in order to achieve as uniform a load of the battery cells 28 of a respective one of the series connections 62, 64, 66 as possible. Moreover, this may also be utilized for balancing between the battery cells 28 of a respective one of the series connections 62, 64, 66.

FIG. 5 shows a schematic circuit diagram as in FIG. 4 of a battery 50 instead of the battery 48, differing from the battery 48 in that the series connection 62 is replaced by the series connection 80. The series connections 64 and 66 correspond to those of the battery 48, hence reference is made in this regard to the preceding discussion. The function of the battery 50 as a whole is also based on the preceding discussion.

The series connection 80 differs from the series connection 62 in that a further series connection 82 is connected in parallel to part of the battery cells 28 of the series connection 62. The series connection 82 also has a switching unit 74 to which—as in the series connection 62—battery cells 28 are connected in series. The end-side battery cell 28, which is opposite the switching unit 74 in the series connection 82, is connected with its second cell connector 36 to the fourth cell connector 40 of the battery cells 28 to be connected in parallel accordingly. Accordingly, the semiconductor switching element 30 of this battery cell 28 is in the switched-on state, whereas the switching state of the semiconductor switching element 32 is in the switched-off switching state. Basically, however, this is not important for the second semiconductor switching element 32, specifically because the fourth cell connector 40 of this battery cell is not connected, that is, remains open. As a result of this circuit structure, the series connection 80 has a higher electrical capacitance available when small voltages are provided. Basically, this may also be provided for the further series connections 64, 66. The number of battery cells 28 connected in parallel may vary. In addition, the number of battery cells 28 connected in series may also be varied as required.

It may be derived from the above discussion that the battery 48, 50 may be designed in a modular manner using the battery cells 28, such that it may be easily adapted to specific applications. At the same time, the disclosure enables very different voltages to be provided by the battery 48, 50 in a highly flexible manner. The voltages that can be provided by the battery 48, 50 may be independent of one another. A plurality of different voltages may be provided as required.

Overall, the battery cells 28 are arranged such that, depending on the control of the individual semiconductor switching elements 30, 32, both positive and negative output voltages can be generated. For this purpose, for instance, a positive pole of a battery cell 28 is connected to a negative pole of a preceding battery cell 28 within one of the series connections 62, 64, 66. Additionally, there is a further semiconductor switching element between the negative pole of this battery cell 28 and its following battery cell 28.

This results in all of the battery cells 28 in a respective one of the series connections 62, 64, 66 being connected to one another in series via the semiconductor switching element 30, that is, there is a switching element between the positive pole of one of the battery cells 28 and the negative pole of another subsequent battery cell 28. Each of the battery cells 28 is additionally connected via a respective switch from its negative pole to the positive poles of its "string predecessors" and its "string successors" of the battery cell 28. This forms a base unit.

This base unit can be expanded by any number of battery cells 28, such that a string of battery cells is created which may serve to generate an output voltage, for example, a phase of an AC voltage.

The galvanic cells 12 of the basic unit or battery cell 28 shown may be employed both used individually in a battery cell 28 (FIG. 3) and as a compound of cells connected in series and/or in parallel, such that a simulation of voltage swings may be provided flexibly depending on the application.

Just as many such strings may be connected in parallel to a specified number of battery cells 28, such that a specified topology for outputting a multi-phase AC voltage may be implemented.

The circuit structure may thus be expanded to a matrix circuit made up of battery cells 28 connected in series and in parallel. Additionally, any parallel strings may be inserted within individual phase strings, and several strings may be utilized to form a single phase.

Figure 6:
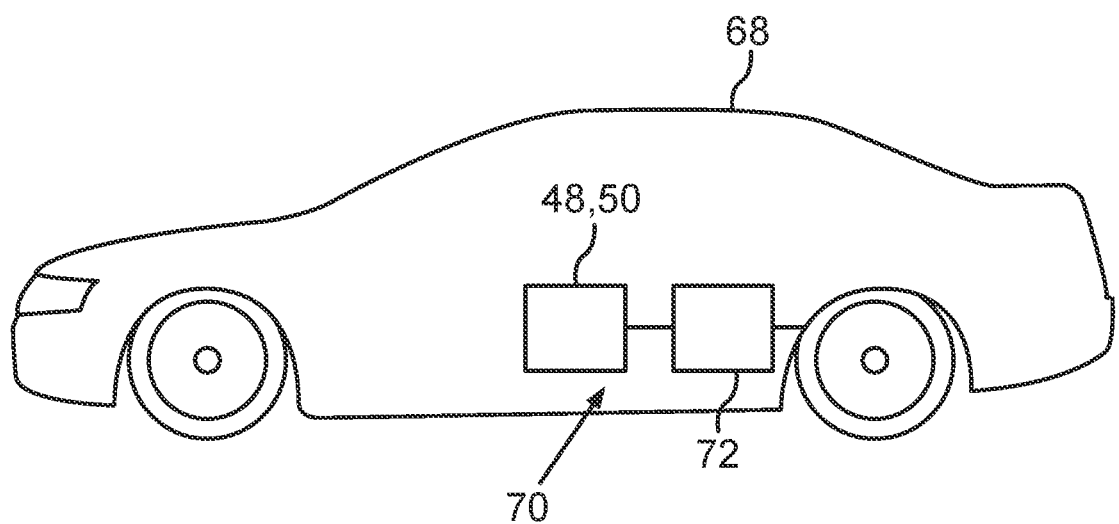
FIG. 6 shows a schematic diagram of a motor vehicle with an on-board network, to which an electric asynchronous machine as a drive equipment and a battery according to FIG. 4, to which the asynchronous machine is connected.

FIG. 6 shows a schematic side view of an electrically drivable motor vehicle 68 comprising an on-board network 70. The on-board network 70 has the asynchronous machine 72 as the drive equipment and the battery 48, 50. The battery 48, 50 is either designed according FIG. 4 or according to FIG. 5 and the asynchronous machine 72 is connected directly to the battery 48, 50. A separate inverter is thus not required for operation of the asynchronous machine 72 as intended because the battery 48, 50 directly provides the three-phase AC voltage for the asynchronous machine 72.

Figure 7:
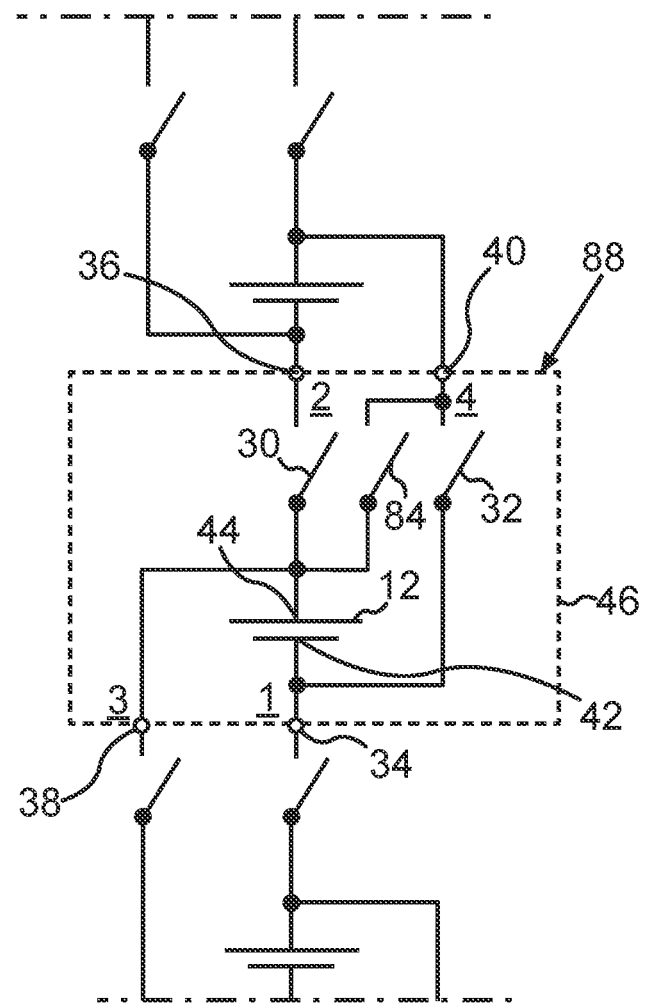
FIG. 7 shows a schematic circuit diagram of a battery cell according to a first aspect.

FIG. 7 shows a battery cell 88 in a schematic circuit diagram view as in FIG. 3, in which an additional switching element, specifically a bypass switching element in the form of a semiconductor switching element 84, is provided compared to the battery cell 28 of FIG. 3. The semiconductor switching element 84 may be designed like the semiconductor switching elements 30, 32. The semiconductor switching element 84 is connected with one connector to the second potential connector 44 of the galvanic cell 12. The other connector of the semiconductor switching element 84, on the other hand, is connected to the fourth cell connector of the battery cell 88. The third semiconductor switching element 84 is thus connected between the third cell connector 38 and the fourth cell connector 40. This additional switching element results in an additional new switching functionality compared to the battery cell 28, which will be explained in more detail below. The battery cell 88 according to FIG. 7 serves to construct a battery 90 as depicted in FIG. 8 in a schematic circuit diagram.

Figure 8:
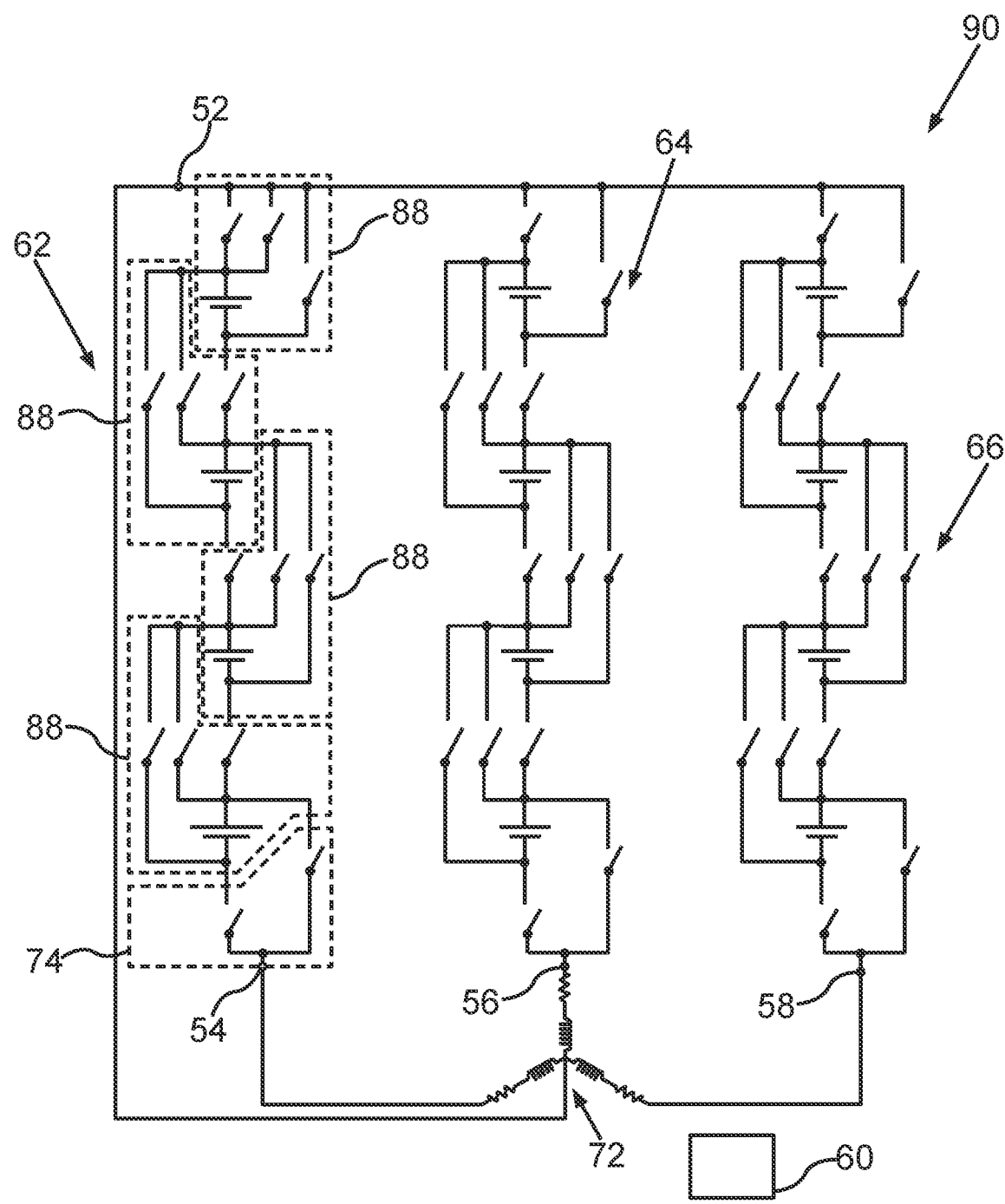
FIG. 8 shows a schematic circuit diagram of a battery according to the first aspect with battery cells according to FIG. 7 connected in three series connections for forming three phases, to which a three-phase asynchronous machine is connected.

FIG. 8 shows the battery 90 in a schematic circuit diagram, the battery 90 basically designed in terms of structure like the battery described for FIG. 4. The battery 90 also has four battery connector poles 52, 54, 56, 58, corresponding to those previously explained for the battery 48 according to FIG. 4, hence reference is made in this regard to the corresponding discussion. A three-phase asynchronous machine 72 is also directly connected to these battery connector poles. Even if the diagram according to FIG. 8 only shows four battery cells 88 in a respective string, the disclosure is not limited to this number of battery cells. Of course, the number of battery cells may be varied, if necessary, in order to be able to provide corresponding voltages or voltage amplitudes for an AC voltage.

In the case of the battery 90 shown in FIG. 8, a semiconductor switching element may be eliminated in the topmost of the battery cells 88, preferably the semiconductor switching element 84. However, this would require a variant of the battery cell 88 in production. In each string, a switching unit 74 is further provided at one of the string ends—as in the battery 48 according to FIG. 4—hence reference is also made in this regard to the discussion of the battery 48 according to FIG. 4.

The battery 90 is characterized in that the battery cells 88 are designed according to FIG. 7. For implementation of the series connections 62, 64, 66, a respective first cell connector 34 of a respective first one of the battery cells 88 is electrically connected to a second cell connector 36 of a respective second one of the battery cells 88, and a respective third cell connector 38 of the respective first one of the battery cells 88 is electrically connected to a fourth cell connector 40 of the respective second one of the battery cells 88. The battery 90 also comprises a control unit 60, as previously explained for the battery 48 according to FIG. 4. The control unit 60 is connected to the first, second and third semiconductor switching elements 30, 32, 84 of the respective battery cells 88 in order to operate the semiconductor switching elements 30, 32, 34 depending on a specified electrical voltage at the respective battery connector poles 52, 54, 56, 58.

In this configuration, the additional semiconductor switching element 84 is arranged as a bypass switching element between a respective positive pole of a battery cell and the pole of the subsequent battery cell. This increases the number of switching elements or semiconductor switching elements for each phase string with n battery cells by n−1 switching elements or semiconductor switching elements.

Figure 9:
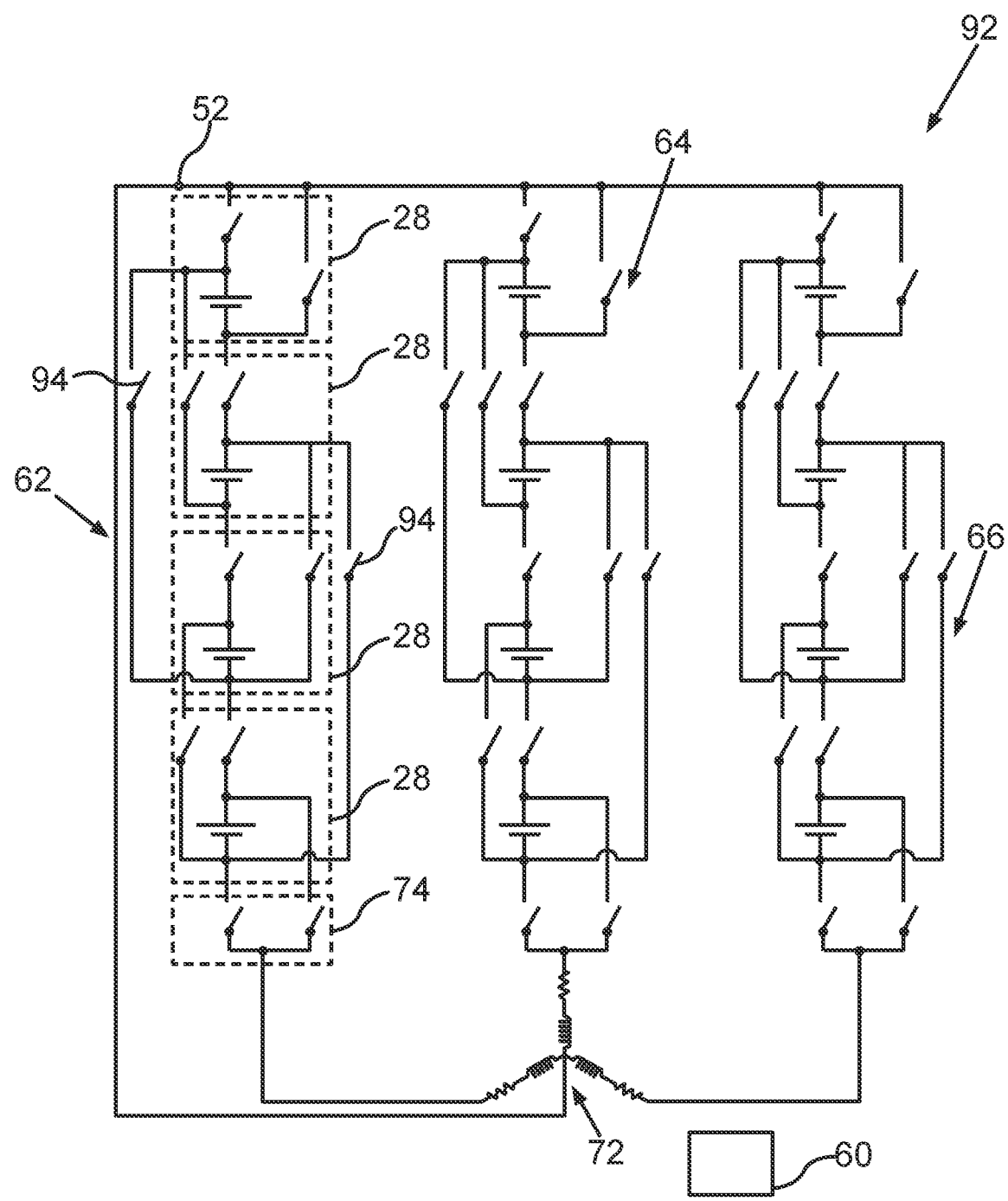
FIG. 9 shows a schematic circuit diagram of a battery according to a second aspect with battery cells according to FIG. 3 connected in three series connections for forming three phases, to which a three-phase asynchronous machine is connected.

FIG. 9 shows a further schematic circuit diagram of a battery 92 according to a second aspect based on the battery 48 described according to FIG. 4 and its battery cells 28 according to FIG. 3. The battery 92 differs from the battery 48 according to FIG. 4 in that two additional bypass switching elements are provided as semiconductor switching elements 94. The bypass switching elements 94 may be designed like the other semiconductor switching elements. Due to the bypass switching elements 94, the battery 92 may basically provide the same functionality as previously explained for the battery 90 according to FIG. 8. However, the number of switching elements or semiconductor switching elements required is reduced overall. This battery 92 according to the second aspect may thus further reduce overall expenditure. The switching elements or semiconductor switching elements are all connected to the control unit 60, which is also provided in the battery, and are operated in a suitable manner in a switching operation. By means of this construction, it may be achieved that n−2 additional semiconductor switches are required for each phase string with n battery cells. This shows that the expenditure for the battery 92 may be reduced compared to the battery 90.

Figure 10:
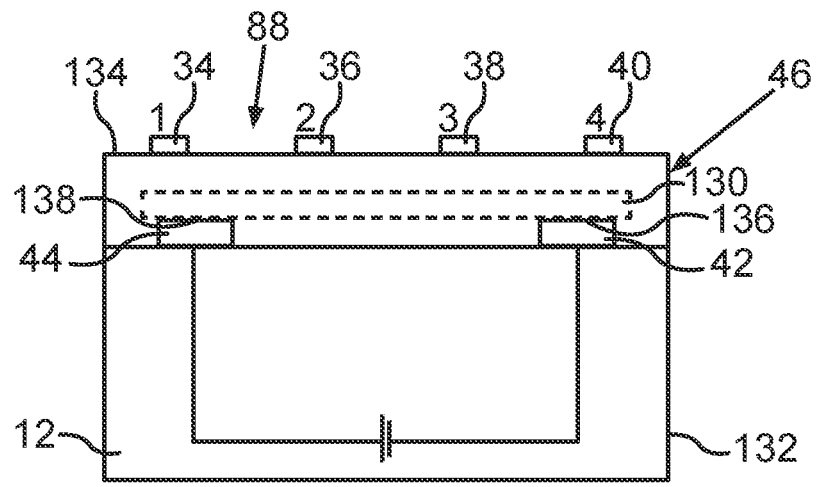
FIG. 10 shows a schematic side view of a battery cell according to FIG. 1 with a cell housing, with a galvanic cell and a printed circuit board with semiconductor switching elements arranged integrated into it.

FIG. 10 shows a schematic side view of the battery cell 88 according to FIG. 7 with a cell housing 46, with a galvanic cell 12 and a printed circuit board 130 with the semiconductor switching elements 30, 32 arranged integrated into it. The cell housing 46 comprises a housing cup 132, with the galvanic cell 12 arranged in the lower region thereof. In FIG. 10, the printed circuit board 130 with the semiconductor switching elements 30, 32 is arranged in the housing cup 132 above the galvanic cell 12, with the semiconductor switching elements 30, 32 not depicted in this figure. The housing cup 132 is closed by means of a housing cover 134, such that the printed circuit board 130 and the galvanic cell 12 are protected from external influences.

The printed circuit board 130 provides contact surfaces 136, 138 as connector contacts for contacting the potential connectors 42, 44 of the galvanic cell 12. Further, the printed circuit board 130 provides further contact surfaces to which the cell connectors 34, 36, 38, 40 are connected. The cell connectors 34, 36, 38, 40 are arranged on the housing cover 134, such that the battery cell 88 may be electrically contacted as intended.

Presently, it is provided that the potential connectors 42, 44 of the galvanic cell 12 are pressed against the contact surfaces 136, 138 of the printed circuit board 130 due to a spring force in order to establish the electrical contact. In alternative configurations, another electric connection may of course also be provided herein, for example, by means of a screw or plug connection or the like. In this configuration, the galvanic cell 12 is arranged integrated with the printed circuit board 130 in the cell housing 46 of the battery cell 88.

Figure 11:
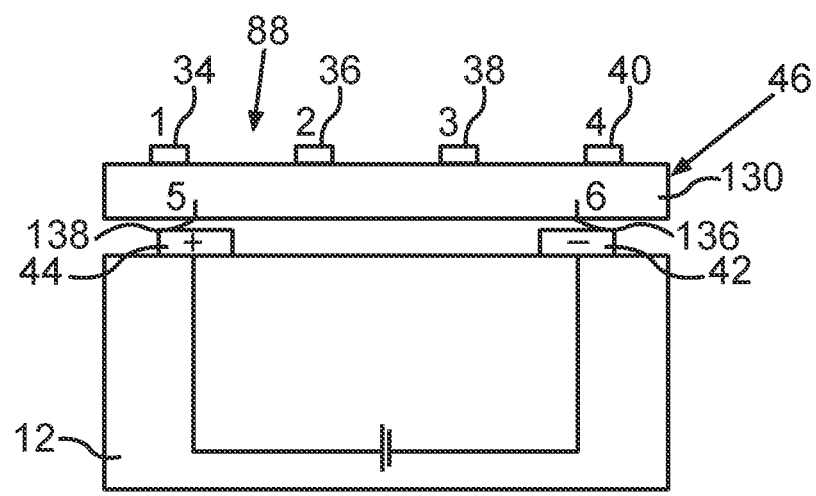
FIG. 11 shows a schematic side view of a battery cell as in FIG. 7, wherein the galvanic cell is releasably arranged on the cell housing.

As an alternative configuration to FIG. 10, FIG. 11 shows a schematic side view of a battery cell as in FIG. 10, wherein the galvanic cell 12 is releasably arranged on the cell housing. In this configuration, the cell housing is formed by the printed circuit board 130 itself. The printed circuit board 130 therefore does not only provide the contact surfaces 136, 138 as connector contacts for contacting the potential connectors 42, 44 of the galvanic cell 12, but rather also provides the cell connectors 34, 36, 38, 40. In this configuration, the galvanic cell 12 may therefore be manufactured separately from the battery cell 88 and connected to the printed circuit board 130. This has the advantage that manufacture of the battery cells 88 and the galvanic cells 12 may be decoupled from one another.

Basically, in an alternative configuration, it may of course also be provided that a cell housing is provided comprising at least the printed circuit board 130 and providing the cell connectors 34, 36, 38, 40. Further, in a further alternative configuration, the cell housing may also provide the connector contacts for the galvanic cell 12 as well as fasteners, such that the galvanic cell 12 may be connected to the cell housing. For this purpose, the connector contacts may be designed, for instance, as screw terminals, by means of which the potential connectors 42, 44 of the galvanic cell 12 may be electrically contacted. At the same time, a mechanical connection may also be achieved by this. Moreover, a mechanical connection of the clip connection type, clamping bracket type, and/or the like may also be provided. These configurations may of course also be combined with one another in almost any way. Basically, the battery cell 28 may be designed correspondingly as well.

The exemplary embodiments serve the sole purpose of explaining the disclosure and are not intended to limit it.

The invention claimed is:

1. A battery cell, comprising:
   a galvanic cell;
   a first semiconductor switching element;
   a second semiconductor switching element;
   a first cell connector electrically coupled directly to a first potential connector of the galvanic cell; and
   a second cell connector electrically coupled to a second potential connector of the galvanic cell via the first semiconductor switching element;
   a third cell connector electrically coupled to the second potential connector of the galvanic cell; and
   a fourth cell connector electrically coupled to the first potential connector of the galvanic cell via the second semiconductor switching element, wherein a third semiconductor switching element is connected between the third cell connector and the fourth cell connector and there is always only one semiconductor switching element in a current-carrying path for the battery cell.

2. The battery cell of claim 1, wherein a cell housing in which at least the first, second and third semiconductor switching elements are arranged and which has at least one connector contact for each of the cell connectors for providing a respective one of the cell connectors, wherein the connector contacts are arranged electrically isolated from one another.

3. The battery cell of claim 1, further comprising:
   several battery cells,
   at least two battery connector poles, and
   a control unit, wherein a specified number of the several battery cells is connected in series and the series connection is connected with a first end to a first one of the at least two battery connector poles and with a second end to a second one of the at least two battery connector poles, wherein for implementation of the series connection,
   a respective first cell connector of a respective first one of the battery cells is electrically connected to a second cell connector of a respective second one of the battery cells, and
   a respective third cell connector of the respective first one of the battery cells is electrically connected to a fourth cell connector of the respective second one of the battery cells, and the control unit is connected to at least first, second and third semiconductor switching elements of the respective battery cells in order to operate the semiconductor switching elements depending on a specifiable electrical voltage at the respective battery connector poles.

4. A battery with several battery cells, comprising:
at least two battery connector poles; and
a control unit, wherein a specified number of the several battery cells is connected in series and the series connection is connected with a first end to a first one of the at least two battery connector poles and with a second end to a second one of the at least two battery connector poles, the several battery cells each have:
a galvanic cell,
a first semiconductor switching element,
a second semiconductor switching element,
a first cell connector electrically coupled directly to a first potential connector of the galvanic cell,
a second cell connector electrically coupled to a second potential connector of the galvanic cell via the first semiconductor switching element,
a third cell connector electrically coupled to the second potential connector of the galvanic cell, and
a fourth cell connector electrically coupled to the first potential connector of the galvanic cell via the second semiconductor switching element, wherein for implementation of the series connection, a respective first cell connector of a respective first one of the battery cells is electrically connected to a second cell connector of a respective second one of the battery cells, and a respective third cell connector of the respective first one of the battery cells is electrically connected to a fourth cell connector of the respective second one of the battery cells, the control unit is connected to at least the first and second semiconductor switching elements of the respective battery cells as well as to the at least one bypass switching element in order to operate the semiconductor switching elements and the at least one bypass switching element depending on a specifiable electrical voltage at the respective battery connector poles, and there is always only one semiconductor switching element in a current-carrying path for each battery cell; and
a bypass switching element is configured to bypass galvanic cells of three directly consecutive battery cells in the series connection.

5. The battery of claim 4, wherein at least one battery cell is connected in parallel to one of the battery cells connected in series by electrically connecting their respective cell connectors to one another.

6. The battery of claim 4, wherein a corresponding number of further battery cells connected in series is connected in parallel to a specified number of battery cells of the series connection connected directly in series by electrically connecting the cell connectors of such further battery cells arranged at end sides to the corresponding end-side cell connectors of the number of battery cells connected directly in series.

\* \* \* \* \*